United States Patent
Tomita et al.

(10) Patent No.: US 7,292,509 B2
(45) Date of Patent: Nov. 6, 2007

(54) RECORDING DISC AND APPARATUS AND METHOD FOR REPRODUCING RECORDED INFORMATION

(75) Inventors: Yoshimi Tomita, Tsurugashima (JP); Tetsuya Iida, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 508 days.

(21) Appl. No.: 10/417,211

(22) Filed: Apr. 17, 2003

(65) Prior Publication Data

US 2003/0202436 A1 Oct. 30, 2003

(30) Foreign Application Priority Data

Apr. 30, 2002 (JP) ............................. 2002-128219
Sep. 4, 2002 (JP) ............................. 2002-258656

(51) Int. Cl.
*G11B 7/007* (2006.01)

(52) U.S. Cl. ............................... 369/44.26; 369/53.37; 369/275.3

(58) Field of Classification Search ............ 369/275.3, 369/44.26, 44.29, 14, 94, 275.1, 283, 286
See application file for complete search history.

(56) References Cited

U.S. PATENT DOCUMENTS

| | | | | |
|---|---|---|---|---|
| 4,972,399 A * | 11/1990 | Miyasaka | ............... | 369/44.27 |
| 5,124,962 A * | 6/1992 | Haneji | ............... | 369/44.28 |
| 5,255,262 A | 10/1993 | Best et al. | | |
| 5,452,284 A | 9/1995 | Miyagawa et al. | | |
| 6,052,465 A | 4/2000 | Gotoh et al. | | |
| 6,078,559 A | 6/2000 | Takemura et al. | | |
| 6,272,086 B1 | 8/2001 | Jaquette et al. | | |
| 6,295,262 B1 * | 9/2001 | Kusumoto et al. | ............ | 369/53.2 |
| 6,343,062 B1 | 1/2002 | Furukawa et al. | | |
| 6,377,526 B1 * | 4/2002 | Vining et al. | ............ | 369/275.3 |
| 6,937,544 B2 * | 8/2005 | Takehara et al. | ......... | 369/44.27 |
| 6,958,965 B2 * | 10/2005 | Ueda et al. | .............. | 369/53.21 |
| 6,992,959 B1 * | 1/2006 | Tosaki et al. | ............ | 369/53.21 |
| 2001/0007545 A1 * | 7/2001 | Ueda et al. | .............. | 369/53.21 |
| 2003/0016603 A1 * | 1/2003 | Tomita | ................... | 369/275.3 |
| 2003/0048719 A1 * | 3/2003 | Kawashima et al. | ..... | 369/275.3 |
| 2003/0137910 A1 * | 7/2003 | Ueda et al. | .............. | 369/275.3 |
| 2003/0179688 A1 * | 9/2003 | Blankenbeckler et al. | ...................... | 369/275.3 |

FOREIGN PATENT DOCUMENTS

| | | |
|---|---|---|
| CN | 1213125 A | 4/1999 |
| JP | 57-050330 | 3/1982 |
| JP | 5-15644 | 6/1993 |
| JP | 2001-028134 | 1/2001 |
| JP | 2001-250247 | 9/2001 |
| JP | 2001-266414 | 9/2001 |
| JP | 2002-56544 | 2/2002 |
| WO | WO 2000026912 A * | 5/2000 |
| WO | WO 01/88917 A1 | 11/2001 |

OTHER PUBLICATIONS

Japanese Office Action.

* cited by examiner

*Primary Examiner*—William R. Korzuch
*Assistant Examiner*—Nathan Danielsen
(74) *Attorney, Agent, or Firm*—Sughrue Mion, PLLC

(57) ABSTRACT

A recording disc and recorded information reproducing apparatus and method for immediately starting reproduction of information when a push-pull based tracking control is employed to reproduce recorded information from the recording disc. The recording disc comprises an information data area for recording recording marks which carry information data in columns, and a control data area for recording identification information indicative of a recording pattern of the recording marks in the information data area.

8 Claims, 14 Drawing Sheets

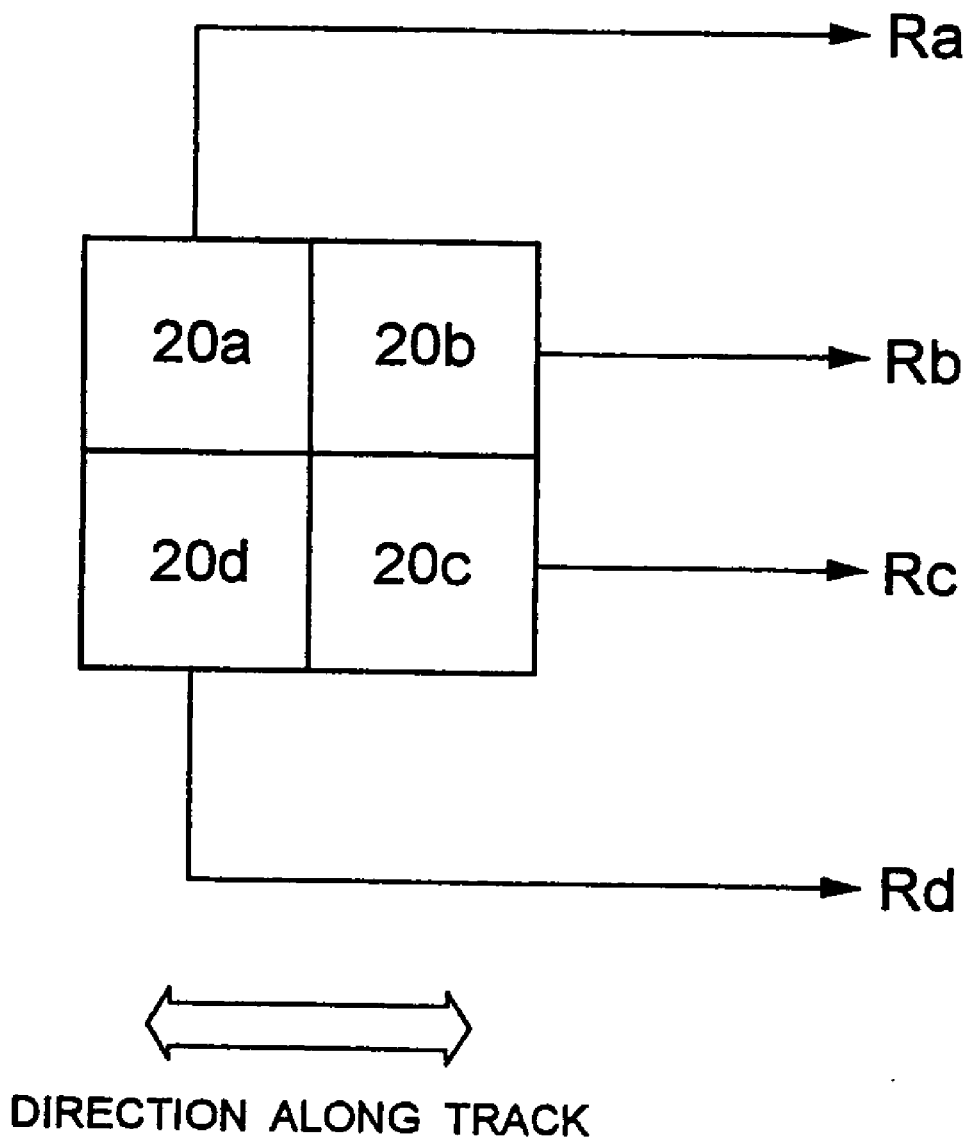

FIG. 6
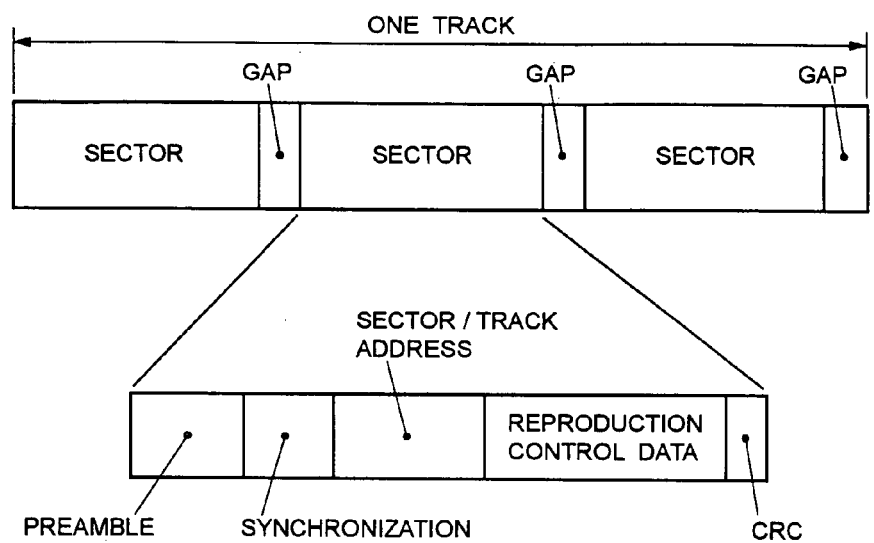
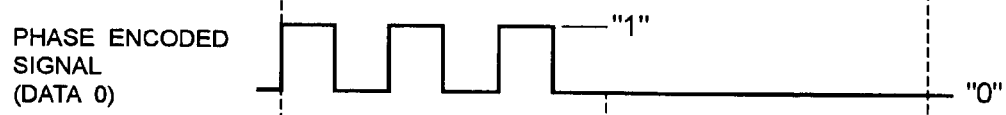
FIG. 7A
PHASE ENCODED
SIGNAL
(DATA 0)
FIG. 7B
PHASE ENCODED
SIGNAL
(DATA 1)
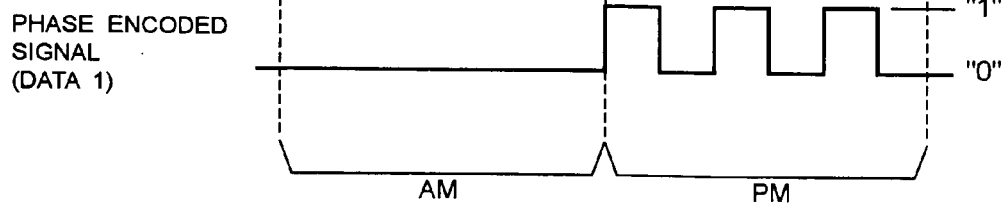

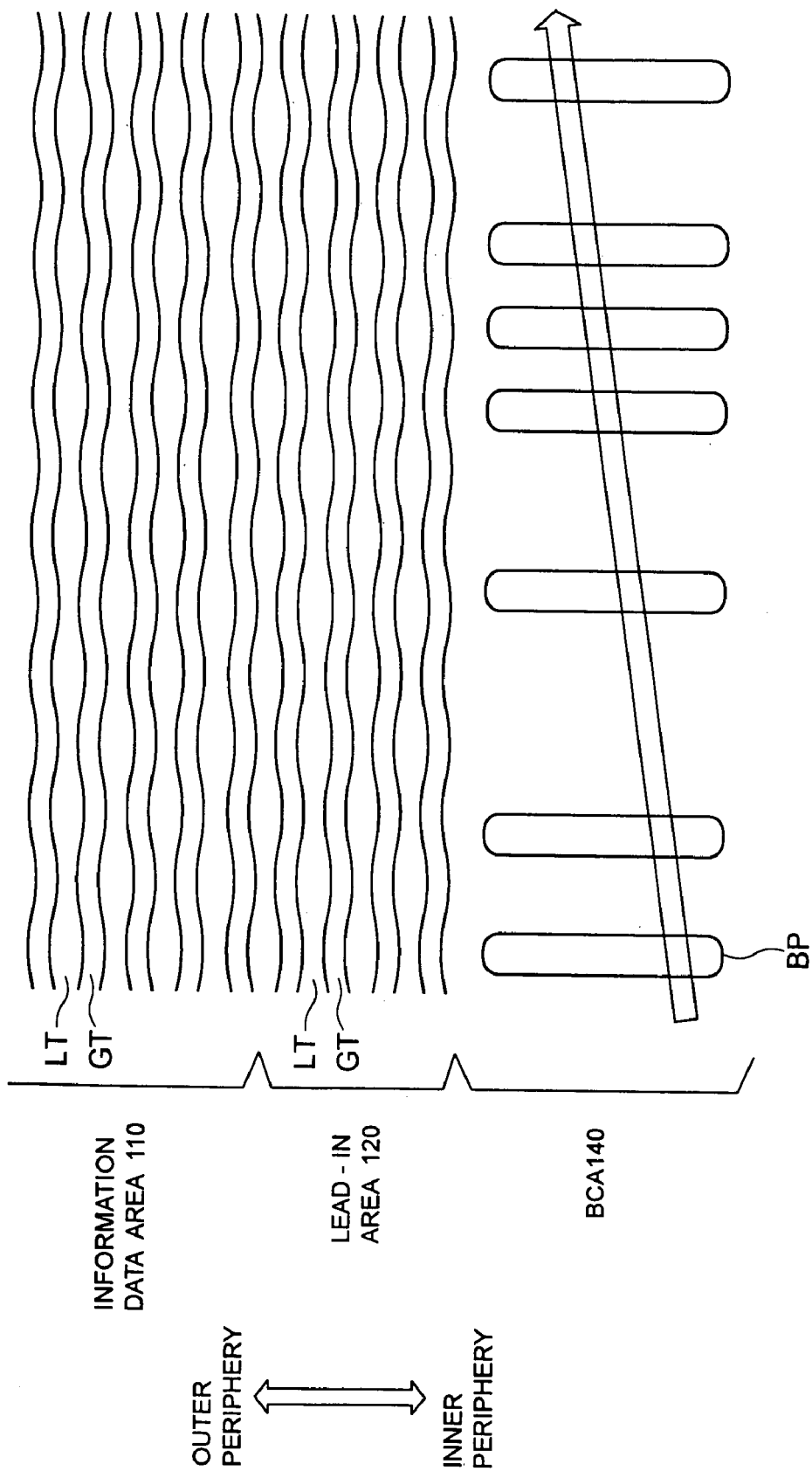

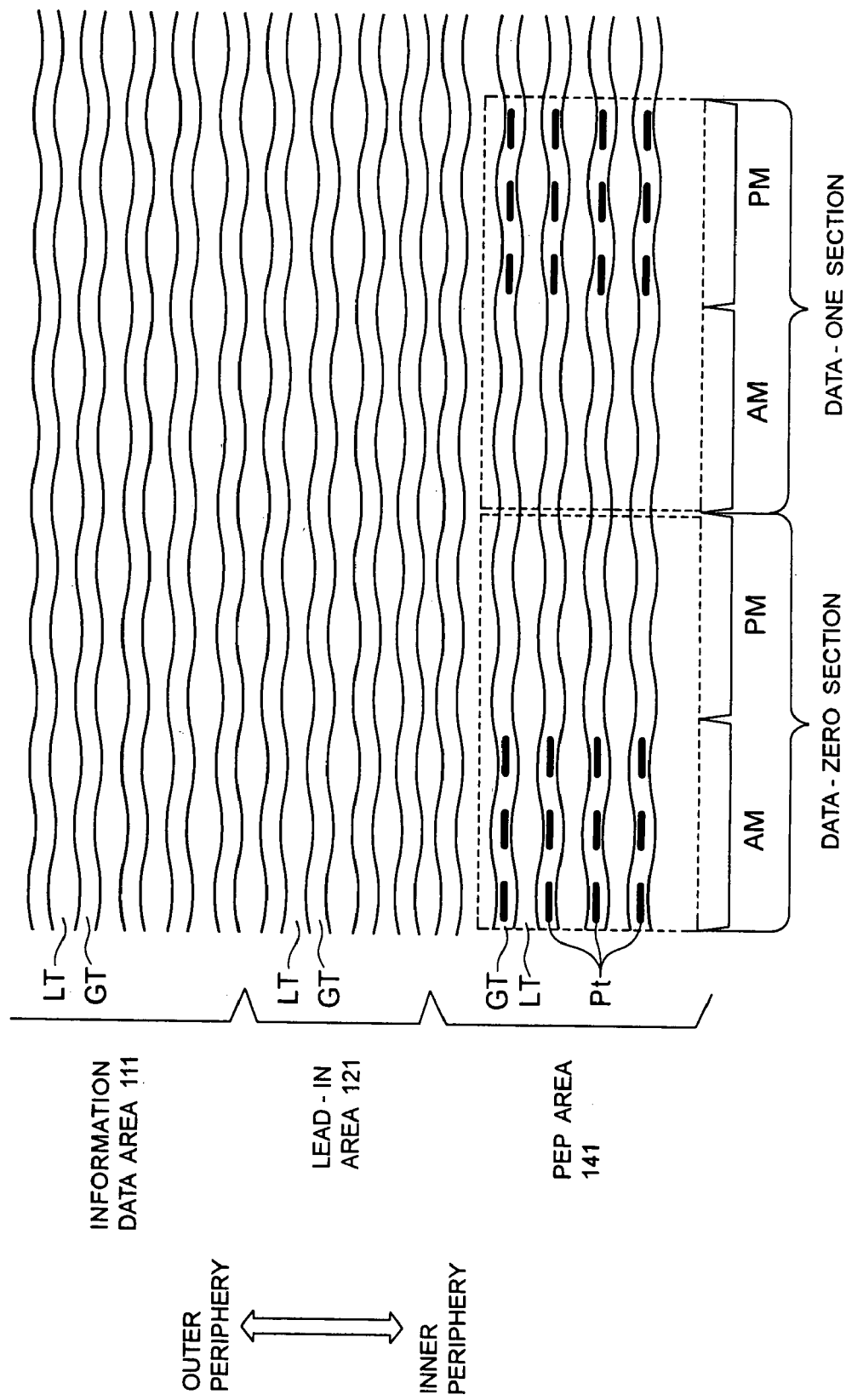

RECORDING DISC AND APPARATUS AND METHOD FOR REPRODUCING RECORDED INFORMATION

BACKGROUND OF THE INVENTION

1. Field of the Invention

The present invention relates to a recording disc, and a recorded information reproducing apparatus and method for reproducing recorded information from the recording disc.

2. Description of Related Art

Today, DVD-ROM is widely used as a read-only optical recording medium which has previously recorded thereon information data such as audio, video, computer data and the like. The DVD-ROM has, for example, a two-layer recording surface comprised of a first recording layer and a second recording layer. When viewing the first recording layer from the top layer from which a reading beam light is irradiated onto the DVD-ROM, a recording pit train carrying information data is formed on a spiral or concentric track. On the other hand, when viewing the second recording layer from the bottom surface of the DVD-ROM, a recording pit train carrying information data is formed on a spiral or concentric track. Specifically, when viewing the first and second recording layers from the top surface of the DVD-ROM, convex recording pits are formed in the first recording layer, while concave recording pits are formed in the second recording layer. For this reason, the recording pits recorded in the first recording layer are hereinafter referred to as the "convex recording pits," while the recording pits recorded in the second recording layer to the "concave recording pits."

A conventional reproducing apparatus for reproducing recorded information from the DVD-ROM conducts a tracking servo in accordance with a DPD (Differential Phase Detection) scheme. In the DPD-based tracking control, reflection from the recording disc irradiated with a beam light is individually received by four photodetectors 20a–20d, arranged in a manner as illustrated in FIG. 1, which opto-electrically transduce the reflection into read signals Ra–Rd which are used in the tracking control. Then, these read signals Ra–Rd are used in the following calculations to generate a high frequency signal and a diagonal differential signal. The difference in phase between the two signals is used as an error signal for conducting the tracking control:

High Frequency Signal=$Ra+Rb+Rc+Rd$

Diagonal Differential Signal=$(Ra+Rc)-(Rb+Rd)$

The employment of the DPD scheme results in the satisfactory tracking control both for the first recording layer in which convex recording pits are recorded and for the second recording layer in which concave recording pits are recorded.

On the other hand, a writable recording disk such as DVD-R or DVD-RW is previously formed with a recording track which has a wobble pattern corresponding to disc addresses indicative of positions on the disc. A recorded information reproducing apparatus for recording and reproducing information data to and from the DVD-R or DVD-RW reads the wobble pattern on the recording track formed on the recording disc to recognize the position on the disc, while information data is being recorded. In this event, a push-pull signal is used for reading the wobble pattern on the recording track. The push-pull signal is generated in accordance with the following calculation using read signals Ra–Rd which are generated by four photodetectors 20a–20d as illustrated in FIG. 1 which individually receive and opto-electrically transduce reflected light from the disc:

Push-Pull Signal=$(Ra+Rb)-(Rc+Rd)$

In addition, the recorded information reproducing apparatus conducts a tracking servo based on the push-pull signal. Specifically, the recorded information reproducing apparatus for recording and reproducing information data to and from a recording disc such as DVD-R or DVD-RW acquires disc addresses corresponding to the wobble pattern on the recording track based on the push-pull signal while conducting the tracking control.

Thus, the conventional recorded information reproducing apparatus which supports any of DVD-R, DVD-RW and DVD-ROM comprises dedicated processing circuits for generating the push-pull signal, high frequency signal and diagonal differential signal, respectively, resulting in an extremely large scale of the apparatus. There has been therefore a need for a recorded information reproducing apparatus which only requires the push-pull signal to conduct the tracking servo for any of DVD-R, DVD-RW and DVD-ROM.

However, the push-pull signal generated when the convex recording pit train is read from the first recording layer of the DVD-ROM as mentioned above is opposite in polarity to the push-pull signal generated when the concave recording pit train is read from the second recording layer. As such, for reproducing recorded information from the DVD-ROM, information data is first read from a recording layer intended for reproduction on a trial basis. In this event, when an appropriate tracking control is failed, the polarity of the push-pull signal is reversed, followed by a repetition of the read operation again from the initial position.

Therefore, the read operation may not be immediately started in some cases when the tracking control is conducted using the push-pull signal for a multi-layer recording layer which has a recording layer having a convex recording pit train recorded therein and a recording layer having a concave recording pit train recorded therein, or for a single-layer recording disc on which no recording pits are defined in a convex or concave shape.

OBJECT AND SUMMARY OF THE INVENTION

The present invention has been made to solve the foregoing problem, and it is an object of the invention to provide a recording disc, and an apparatus and method for reproducing recorded information which can permit a reproducing operation to be immediately started for reproducing information data from the recording disc using a push-pull based tracking control.

A recorded information reproducing information data thereon, according to a first aspect of the present invention, includes an information data in columns, and a control data area for recording identification information indicative of a recording pattern of the recording marks in the information data area.

A recorded information reproducing apparatus according to another aspect of the present invention is configured to reproduce recorded information from a recording disc having an information data area for recording recording marks carrying the information data in columns, and a control data area for recording identification information indicative of a recording pattern of the recording marks in the information data area. The recorded information reproducing apparatus includes a reading component for receiving reflected light from the recording disc irradiated with reading beam light and opto-electrically transducing the reflected light into read signals by at least two photodetectors arranged in a direction perpendicular to a track, a push-pull read signal generator for calculating a difference between the read signals generated by the respective photodetectors to output the difference as a push-pull read signal, a tracking servo for biasing the optical axis of the reading light beam in the direction perpendicular to the track based on the push-pull read signal, an identification information reading component for reading the identification information from the control data area, an identifying component for identifying a recording pattern of the recording marks recorded in the information data area based on the identification information, and a polarity reversing component for reversing the polarity of the push-pull read signal in accordance with the result of the identification made by the identifying component.

A recorded information reproducing method according to a further aspect of the present invention is provided for reproducing recorded information from a recording disc having an information data area for recording recording marks carrying the information data in columns, and a control data area for recording identification information indicative of a recording pattern of the recording marks in the information data area. The recorded information reproducing method includes a reading step for receiving reflected light from the recording disc irradiated with reading beam light and opto-electrically transducing the reflected light into read signals by at least two photodetectors arranged in a direction perpendicular to a track, a push-pull read signal generating step for calculating a difference between the read signals generated by the respective photodetectors to output the difference as a push-pull read signal, a tracking control step for biasing the optical axis of the reading light beam in the direction perpendicular to the track based on the push-pull read signal, an identification information reading step for reading the identification information from the control data area, an identifying step for identifying a recording pattern of the recording marks recorded in the information data area based on the identification information, and a polarity reversing step for reversing the polarity of the push-pull read signal in accordance with the result of the identification made by the identifying step.

A recording disc according to a further aspect of the present invention includes a plurality of recording layers, wherein each recording layer has an information data area for recording recording pits carrying information data in columns, and a control data area for recording a convex/concave identification information indicating with respect to at least one of the recording layers whether each recording pit recorded on each recording layer is convex or concave.

A recorded information reproducing apparatus according to a further aspect of the present invention is configured to reproduce recorded information from a recording disc having a plurality of recording layers, wherein each recording layer includes an information data area for recording recording pits carrying information data in columns, and a control data area for recording a convex/concave identification information indicating with respect to at least one of the recording layers whether each recording pit recorded on each recording layer is convex or concave. The recorded information reproducing apparatus includes a reading component for receiving reflected light from the recording disc irradiated with reading beam light and opto-electrically transducing the reflected light into read signals by at least two photodetectors arranged in a direction perpendicular to a track, a push-pull read signal generator for calculating a difference between the read signals generated by the respective photodetectors to output the difference as a push-pull read signal, a tracking servo for biasing the optical axis of the reading light beam in the direction perpendicular to the track based on the push-pull read signal, a convex/concave identification information reading component for reading the convex/concave identification information from the control data area, a convex/concave identifying component for identifying the shape of the recording pits recorded in one of the recording layers from which information is to be reproduced, based on the convex/concave identification information, and a polarity reversing component for reversing the polarity of the push-pull read signal in accordance with the result of the identification made by the convex/concave identifying component.

A recorded information reproducing method according to a further aspect of the present invention is provided for reproducing recorded information from a recording disc having a plurality of recording layers, wherein each recording layer includes an information data area for recording recording pits carrying information data in columns, and a control data area for recording a convex/concave identification information indicating with respect to at least one of the recording layers whether each recording pit recorded on each recording layer is convex or concave. The recorded information reproducing method includes a push-pull read signal generating step for generating a push-pull read signal based on read signals read from the recording disc, a tracking control step for biasing the optical axis of the reading light beam in a direction perpendicular to a track based on the push-pull read signal, a convex/concave identification information reading step for reading the convex/concave identification information from the recording disc, a convex/concave identifying step for identifying the shape of the recording pits recorded in one of the recording layers from which information is to be reproduced, based on the convex/concave identification information, and a polarity reversing step for reversing the polarity of the push-pull read signal in accordance with the result of the identification made by the convex/concave identifying step.

BRIEF DESCRIPTION OF THE DRAWINGS

FIG. 1 is a diagram illustrating an exemplary arrangement of photodetectors 20a–20d mounted in a pickup;

FIG. 6 is a diagram showing a format for one track in a PEP area 4;

FIGS. 7A and 7B are diagrams showing the waveforms of phase encoded signals corresponding to one bit length of data;

FIG. 12 is a diagram illustrating a portion of a pattern on the surface of the recording disc illustrated in FIG. 11;

FIG. 15 is a diagram illustrating a portion of a pattern on the surface of the recording disc illustrated in FIG. 14.

DETAILED DESCRIPTION OF THE EMBODIMENTS

Figure 2A:
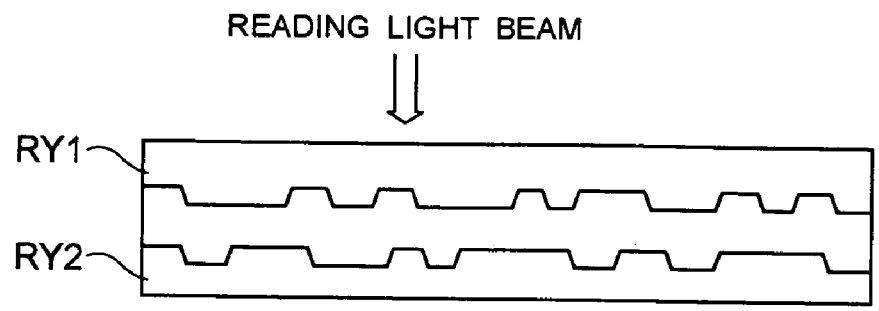
FIGS. 2A and 2B are diagrams generally illustrating the structure of a recording disc according to the present invention.
Figure 2B:
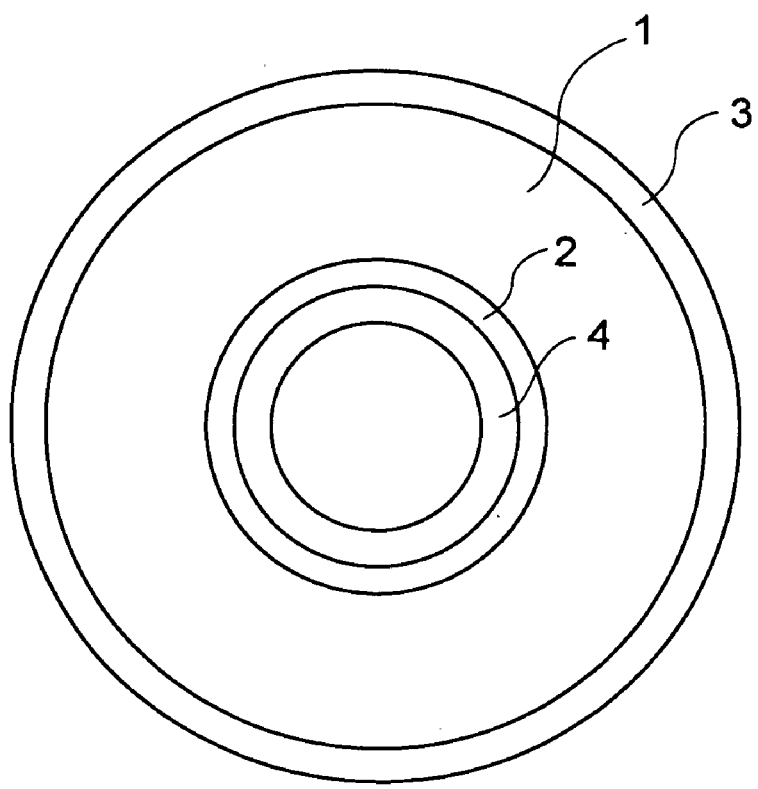

FIGS. 2A and 2B generally illustrate an exemplary structure of a recording disc according to the present invention.

FIG. 2A is a cross-sectional view of the recording disc.

As illustrated in FIG. 2A, the recording disc comprises a first recording layer RY1 in which convex recording pits are recorded and a second recording layer RY2 in which concave recording pits are recorded. Each of these first recording layer RY1 and second recording layer RY2 is divided into an information data area 1, a lead-in area 2, a lead-out area 3, and a PEP (phase encoded part) area 4, as illustrated in FIG. 2B. The PEP area 4 may be provided only in one of the recording layer RY1 and second recording layer RY2.

The information data area 1 is an area in which a variety of information data is recorded, such as video, audio, and computer data. The lead-in area 2 in turn is an area in which lead-in data is recorded, including a recorded position, required time for reproduction, disc identification information and the like for each of information data pieces recorded in the information data area 1. The PEP area 4 in turn is an area in which phase encoded reproduction control data (later described) is recorded, including tracking information, convex/concave identification information and the like. The tracking information refers to such information for specifying a tracking method which should be conducted for reading recorded information from the first recording layer RY1 and second recording layer RY2. The convex/concave identification information refers to such information indicative of whether each of recording pits recorded in the first recording layer RY1 and second recording layer RY2 is convex or concave.

Figure 3:
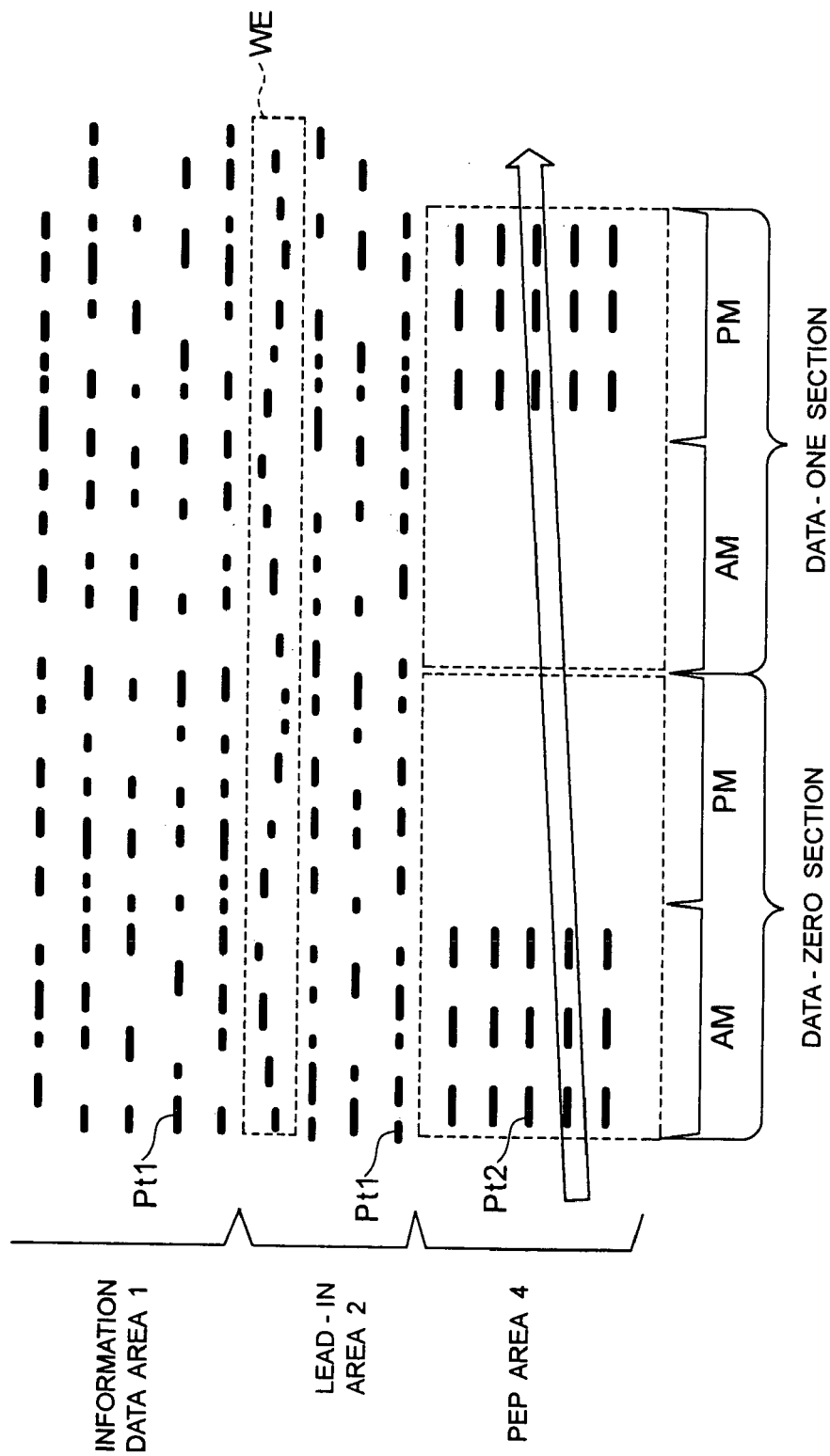
FIG. 3 is a diagram illustrating a portion of a pattern on the surface of a recording layer of the recording disc according to the present invention.

FIG. 3 is a diagram, viewed from the top surface of the disc, illustrating an exemplary recording pattern in each area of the first recording layer RY1 (or the second recording layer RY2).

As illustrated in FIG. 3, the information data area 1 is formed with pit trains comprised of recording pits Pt1 which carry information data. The lead-in area 2 in turn is formed with pit trains comprised of recording pits Pt1 which carry the lead-in data. It should be noted that in the lead-in area 2, an area WE for recording the disc identification information is formed with a pit train, as illustrated in FIG. 3, which wobbles in a pattern corresponding to the disc identification information. The PEP area 4 is formed with pit trains comprised of recording pits Pt2 corresponding to a phase encoded signal which is generated by phase encoded reproduction control data including the convex/concave identification information. In this event, each of the recording pits Pt1 formed in the PEP area 4 has the same recording pit length. In the PEP area 4, each of the recording pits pt2 is formed on one of a plurality of tracks adjacent to each other such that it is in alignment to the direction perpendicular to the track.

Figure 4A:
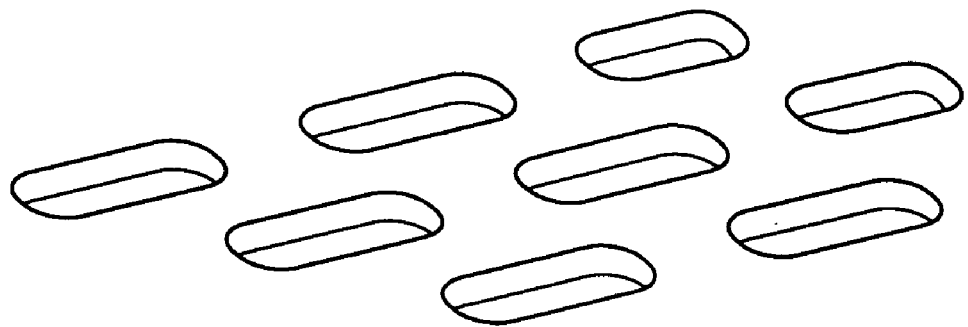
FIGS. 4A and 4B are diagrams illustrating concave recording pits and convex recording pits, respectively.
Figure 4B:
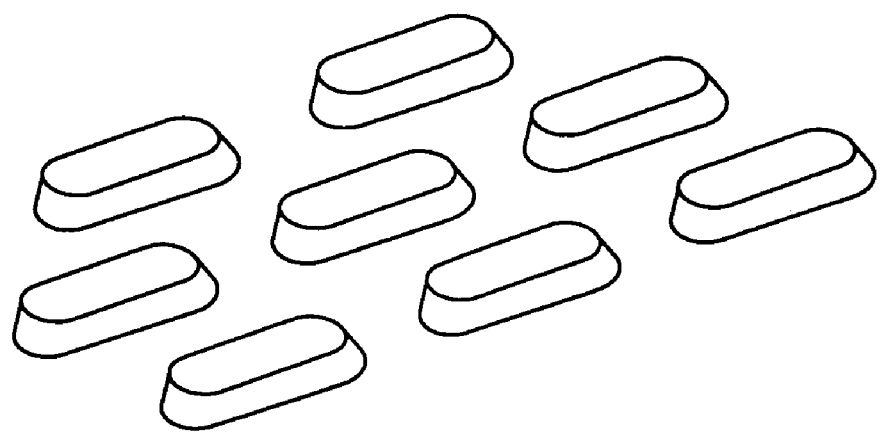

Here, in the first recording layer RY1, each of the recording pits Pt1 and recording pits Pt2 is a convex recording pit which protrudes from the disc surface as illustrated in FIG. 4B. On the other hand, in the recording layer RY2, each of the recording pits Pt1 and recording pits Pt2 is a convex recording pit which recesses into the disc surface, as illustrated in FIG. 4A.

Since the convex and concave recording pits are recorded in the first recording layer RY1 and second recording layer RY2, respectively, as described above, the convex/concave identification information forms 2-bit data [01] indicative of that state in the foregoing embodiment. When the concave and convex recording pits are recorded in the first recording layer RY1 and second recording layer RY2, respectively, the convex/concave identification information forms 2-bit data [10]. Further, the convex/concave identification information forms 2-bit data [00] when convex recording pits are recorded in both the first recording layer RY1 and second recording layer RY2, and forms 2-bit data [11] when concave recording pits are recorded in both the first recording layer RY1 and second recording layer RY2.

Figure 5:
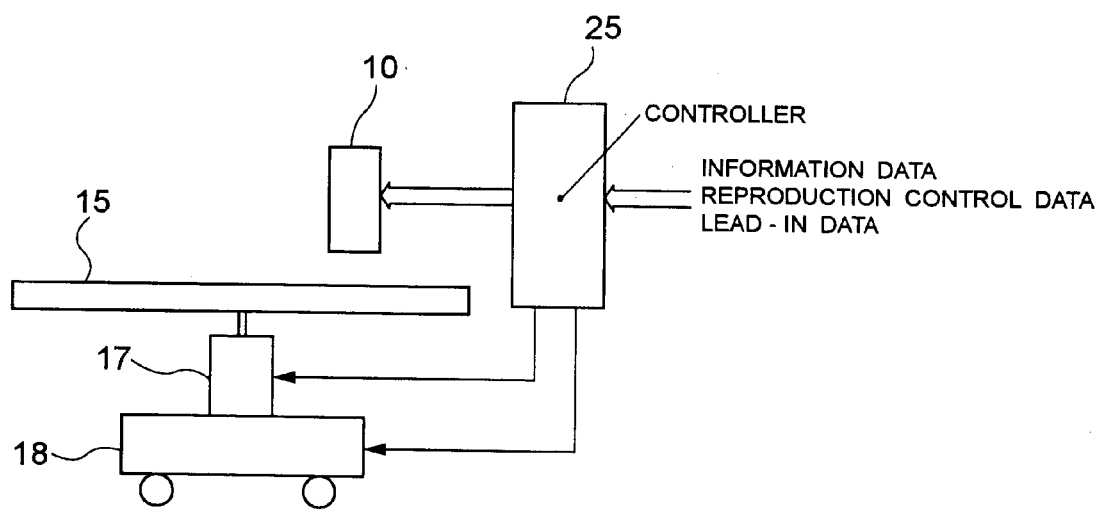
FIG. 5 is a diagram generally illustrating the configuration of a master recording apparatus according to the present invention.

FIG. 5 is a diagram illustrating an exemplary configuration of a master recording apparatus for manufacturing a recording disc which has the structure as described above.

A master 15 is formed with a resist layer on the surface for creating a resist pattern corresponding to the first recording layer RY1 (second recording layer RY2). A spindle motor 17 rotates the master 15 at a constant angular velocity. A feed stage 18 moves the master 15 and spindle motor 17 in the radial direction of the master 15. An electronic beam irradiating apparatus 10 irradiates the surface of the resist layer on the master 15 with an electron beam in accordance with the information data, reproduction control data and lead-in data which have been input for recording on the recording disc.

A controller 25 controls the electron beam irradiating apparatus 10, spindle motor 17 and feed stage 18 to create a resist pattern corresponding to the first recording layer RY1 and a resist pattern corresponding to the second recording layer RY2, respectively.

First, the controller 25 controls the electron beam irradiating apparatus 10 to irradiate an electron beam to an area on the surface of the resist layer corresponding to the information data area 1 as illustrated in FIG. 3 in accordance with information data. As a result, the surface of the resist layer is formed with a latent image corresponding to information pits Pt1 carrying information data in the area corresponding to the information data area 1. The controller 25 also controls the electron beam irradiating apparatus 10 to irradiate an electron beam to an area on the surface of the resist layer corresponding to the lead-in area 2 in accordance with the lead-in data. As a result, the surface of the resist layer is formed with a latent image corresponding to recording pits Pt1 carrying the lead-in data in the area corresponding to the lead-in area 2. The controller 25 further controls the electron beam irradiating apparatus 10 to irradiate an electron beam to an area on the surface of the resist layer corresponding to the PEP area 4 in accordance with a phase encoded signal which is generated by phase encoding the reproduction control data. As a result, the surface of the resist layer is formed with a latent image corresponding to recording pits Pt2 carrying the reproduction control data in the area corresponding to the PEP area 4.

The phase encoding for the reproduction control data is performed, for example, in the following manner.

First, in the PEP area 5, a recording track corresponding to the length of one rotation of the master 15 is regarded as one track. In this event, one track is divided into three sectors, as shown in FIG. 6. Each sector has, for example, the length of 177 bits, and an 11-bit gap is provided between the sectors. One sector is comprised of a 16-bit preamble, a 1-bit synchronization, a 24-bit track address and sector address, a 128-bit reproduction control data, and an 8-bit error detecting code. In this event, the reproduction control data includes the 2-bit convex/concave identification information [01] indicating that convex and concave recording pits are formed in the first recording layer RY1 and second recording layer RY2, respectively.

The controller 25 applies the phase encoding as shown in FIG. 7A or 7B for each of the preamble, synchronization, track address, sector address, reproduction control data and error correcting code to generate phase encoded signals in accordance with the logical levels of the respective pits. For example, a bit at logical level 0 in the reproduction control data is converted to a phase encoded signal which repeats a change between logical levels 1 and 0 in the former half section AM of a predetermined duration T, and is fixed at logical level 0 in the latter half section PM, as shown in FIG. 7A. On the other hand, a bit at logical level 1 in the reproduction control data is converted to a phase encoded signal which is fixed at logical level 0 in the former half section AM of the predetermined duration T, and repeats a change between logical levels 1 and 0 in the latter half section PM, as illustrated in FIG. 7B. The controller 25 repeatedly uses the phase encoded signals for one sector, generated by the phase encoding, in the three sectors as illustrated in FIG. 6, to generate phase encoded signals for one track. The controller 25 further repeatedly supplies the electron beam irradiating apparatus 10 with the phase encoded signals for one track N times. The electron beam irradiating apparatus 10 irradiates the surface of the resist layer on the master 15 with an electron beam only in a period in which the supplied phase encoded signal is at logical level 1. In this way, the surface of the resist layer is formed with a data-zero section and a data-one section in the area corresponding to the PEP area 4 in which pit trains comprised of the recording pits Pt2 are recorded in the patterns as illustrated in FIG. 3. The data-zero section and data-one section refer to those sections on the recording track which are consumed for recording one bit of a variety of data (the preamble, synchronization, track address, sector address, reproduction control data, and error detecting code). In this event, the data-zero section refers to a section indicative of a data bit at logical level 0, in which a latent image corresponding to the recording pit Pt2 is repeatedly formed in the former half section AM, while any latent image is not formed in the latter half section PM. On the other hand, the data-one section refers to a section indicative of a data bit at logical level 1, wherein any latent image is not formed in the former half section AM, while a latent image corresponding to the recording pit Pt2 is repeatedly formed in the latter half section PM. In this event, in the PEP area 4, the latent images corresponding to the recording pits Pt2 are formed in alignment to the disc radial direction, i.e., in the direction perpendicular to the recording track, on each of N recording tracks adjacent to each other. Specifically, in the example illustrated in FIG. 3, the phase encoded signals for one track corresponding to the reproduction control data are recorded in the PEP area 4 on five recording tracks adjacent to each other in a similar manner.

Here, upon completion of recording on the master 15 (formation of the latent images on the resist layer), only the latent images formed on the resist layer of the master 15 are removed to create a resist pattern for forming the first recording layer RY1 (second recording layer RY2). Then, this resist pattern is used to create the first recording layer RY1 which is formed with a pit train comprised of the convex recording pits Pt1 and Pt2, and the second recording layer RY2 which is formed with a pit train comprised of the concave recording pits Pt1 and Pt2.

Next, description will be made on a reproducing apparatus for reproducing recorded information from the recording disc which has the first recording layer RY1 and second recording layer RY2, as described above.

Figure 8:
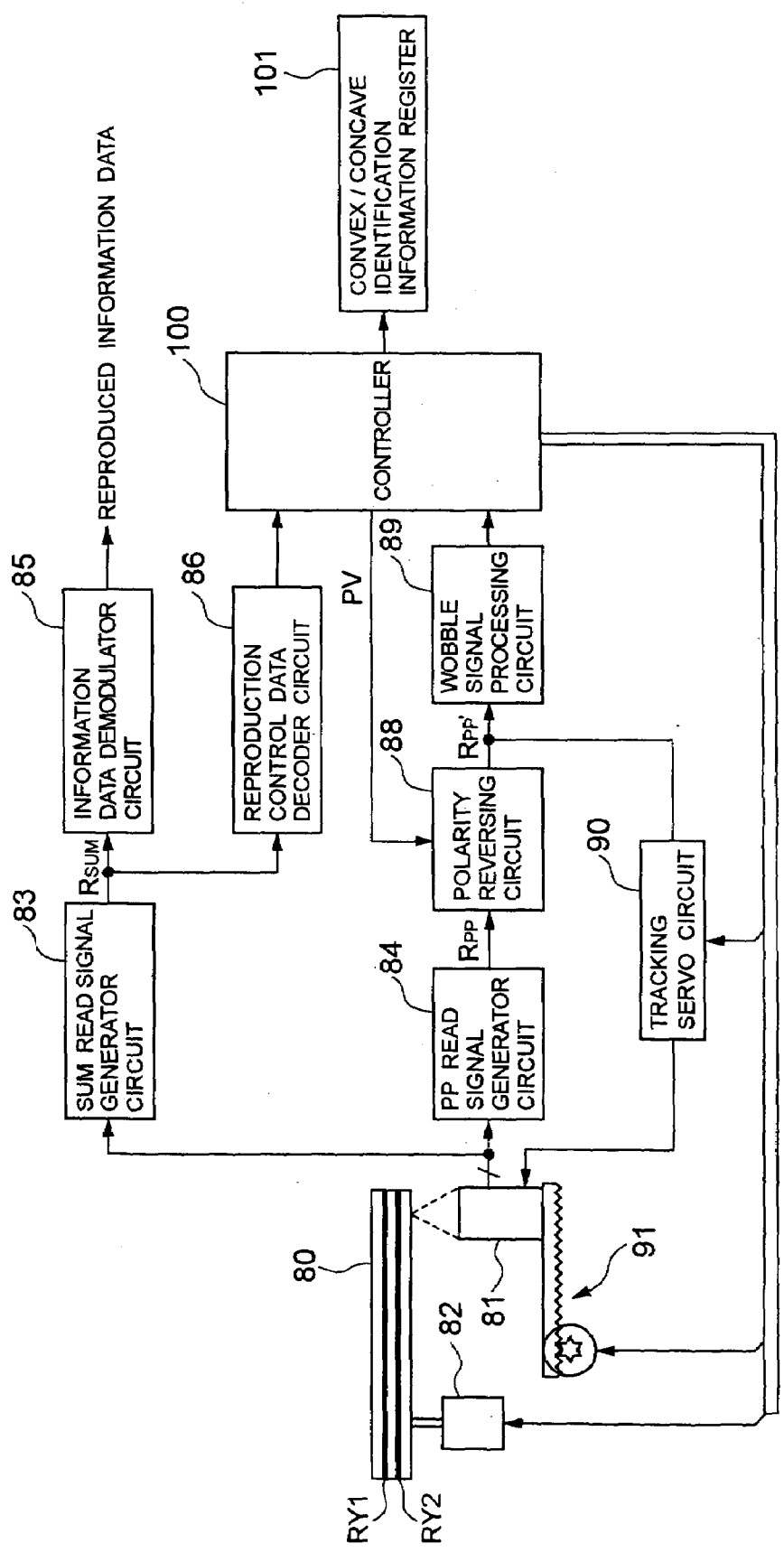
FIG. 8 is a diagram illustrating the configuration of a reproducing apparatus according to the present invention.

FIG. 8 is a diagram illustrating the configuration of the reproducing apparatus.

In FIG. 8, a pickup 81 irradiates reading beam light to the first recording layer RY1 or second recording layer RY2 on a recording disc 80 which is rotated by a spindle motor 82. The pickup 81 comprises four photodetectors 20a–20d arranged in the pattern as illustrated in FIG. 1, which individually receive reflected light from the recording disk 80 and opto-electrically transduce the reflected light to generate read signals Ra–Rd, respectively, which are then supplied to a sum read signal generator circuit 83 and a push-pull read signal generator circuit 84, respectively. A slider mechanism 91 moves the pickup 81 in the disc radial direction.

The sum read signal generator circuit 83 adds the read signals Ra–Rd to generate a sum read signal $R_{SUM}$, which is supplied to an information demodulator circuit 85 and a reproduction control data decoder circuit 86, respectively. The information data demodulator circuit 85 performs predetermined modulation on the sum read signal $R_{SUM}$ to reproduce data recorded in the information data area 1 and lead-in area 2 of the first recording layer RY1 or second recording layer RY2, and outputs the reproduced data as reproduction information data.

The reproduction control data decoder circuit 86 applies phase decoding to a phase encoded signal in the pattern as shown in FIG. 7A or 7B, existing in the sum read signal $R_{SUM}$ to recover reproduction control data comprised of data 0 or data 1, which is supplied to the controller 10.

The push-pull read signal generator circuit 83 generates a push-pull read signal $R_{pp}$ through the following processing using the read signal Ra–Rd, and supplies the push-pull read signal $R_{pp}$ to a polarity reversing circuit 88:

$$R_{pp}=(Ra+Rb)-(Rc+Rd)$$

All of the read signals Ra–Rd are not necessarily used for generating the push-pull signal $R_{pp}$. In essence, the push-pull read signal generator circuit 84 is only required to calculate the difference between the read signals Ra and Rd (or Rb and Rc) output from the photodetectors 20a and 20d (or 20b and 20c) arranged in the direction perpendicular to the track, within the photodetectors 20a–20d, to generate the push-pull read signal $R_{pp}$.

The polarity reversing circuit 88 reverses the polarity of the push-pull read signal $R_{pp}$ and supplies a wobble signal processing circuit 89 and a tracking servo circuit 90, respectively, with the polarity-reversed push-pull read signal $R_{pp}$ as a push-pull read signal $R_{pp}'$ when a polarity reversing signal PV at logical level 1 is supplied from the controller 100. On the other hand, when the polarity reversing signal at logical level 0 is supplied, the polarity reversing circuit 88 supplies the wobble signal processing circuit 89 and tracking servo circuit 90, respectively, with the push-pull read signal $R_{pp}$ as it is as the push-pull read signal $R_{pp}'$. The wobble signal processing circuit 89 extracts disc identification information based on a wobble pattern of a recording pit train formed in the area WE of the lead-in area 2 illustrated in FIG. 3, based on the push-pull read signal $R_{pp}'$, and supplies the disc identification information to the controller 100.

The tracking servo circuit 90 closes a tracking servo loop formed of the pickup circuit 81, push-pull read signal generator circuit 84, polarity reversing circuit 88 and tracking servo circuit 90 when a tracking servo ON signal is supplied from the controller 100. In this event, the tracking servo circuit 90 generates a tracking error signal based on the push-pull read signal $R_{pp}'$, and supplies the tracking error signal to the pickup 81. In response, the pickup 81 biases the optical axis of the reading beam light in the direction perpendicular to the track by an amount corresponding to the tracking error signal in order to make the reading beam light follow the recording pit train recorded on the recording disc 80. On the other hand, when a tracking servo OFF signal is supplied from the controller 100, the tracking servo circuit 90 opens the tracking servo loop. This results in a failure in the operation for making the reading beam light follow the recording pit train, i.e., the tracking operation.

Next, description will be made on the operation of the reproducing apparatus illustrated in FIG. 8.

Figure 9:
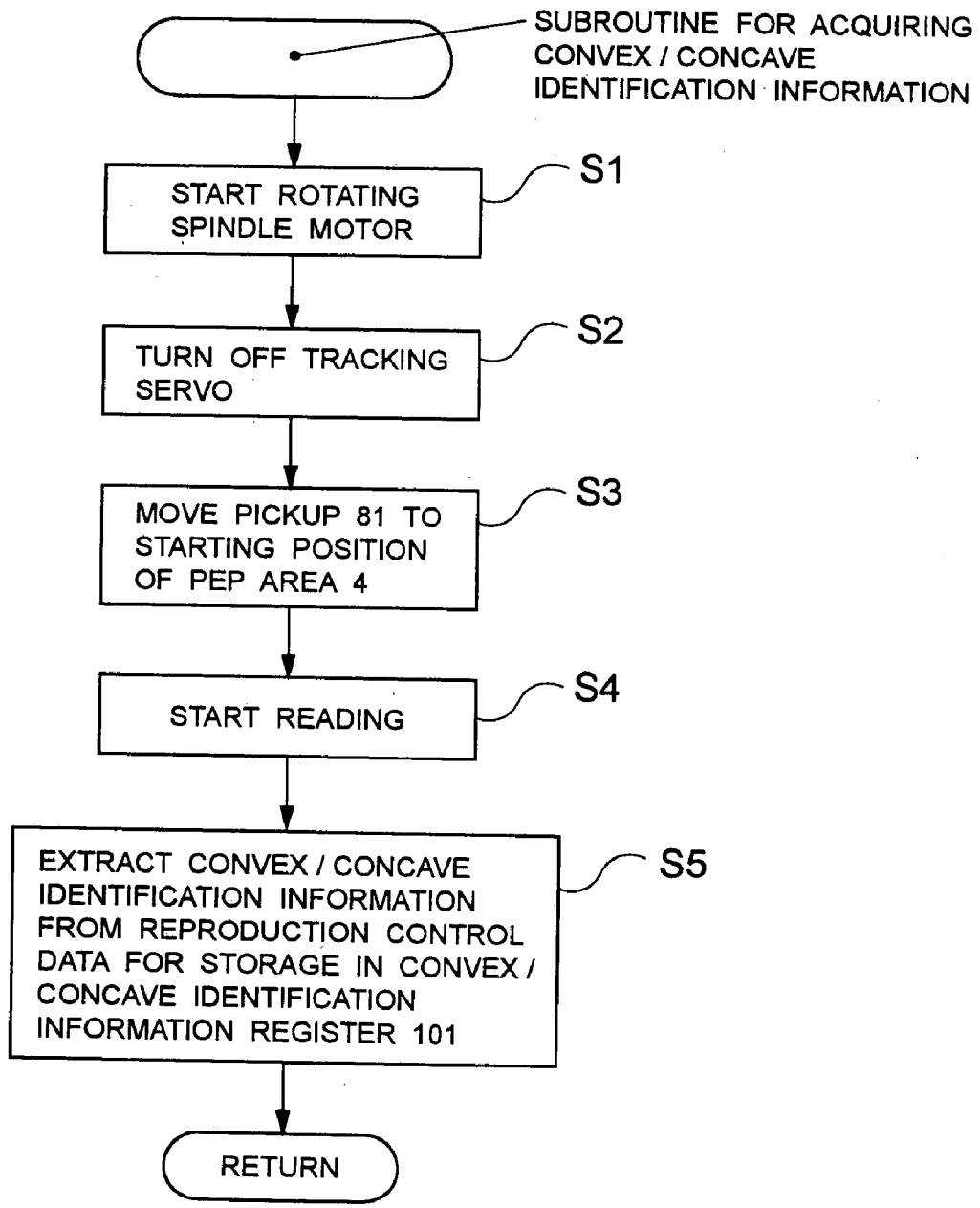
FIG. 9 is a diagram illustrating a subroutine executed by a controller 100 of the reproducing apparatus illustrated in FIG. 8 for acquiring convex/concave identification information.

FIG. 9 is a diagram illustrating a subroutine executed when the reproducing apparatus is loaded with the recording disc 80 for acquiring the convex/concave identification information.

First, in FIG. 9, the controller 100 starts rotating the spindle motor 82 (step S1). Next, the controller 100 supplies a tracking servo OFF signal to the tracking servo circuit 90 (step S2). The execution of step S2 causes the tracking servo loop to open. Next, the controller 100 controls the slider mechanism 91 in order to move the pickup 81 to the starting position of the PEP area 4 on the first recording layer RY1 (step S3), and controls the pickup 81 to start reading recorded information from this position (step S4). The execution of steps S3 and S4 causes the pickup 81 to move to the starting position of the PEP area 4 on the first recording layer RY1 and start reading the recorded information from this position. In this event, since the tracking servo loop is open, reading beam light irradiated from the pickup 81 traces, for example, on an outlined arrow shown in FIG. 3, such that it traverses each track in the PEP area 4. As described above, a recording pit train carrying the reproduction control data, for one turn of the disc, is formed in the PEP area 4 as it is in a similar manner on a plurality of tracks adjacent to each other. In addition, in the PEP area 4, each recording pit Pt2 is recorded such that it is in alignment to the disc radial direction, i.e., the direction perpendicular to the track, as shown in FIG. 3. Therefore, even if the reading beam light moves to traverse each track, the pickup 81 can read an equivalent phase encoded signal from the PEP area 4 to that correctly read from one track. Here, the reproduction control data decoder circuit 86 applies the phase decoding to the phase encoded signal to recover the reproduction control data comprised of data 0 or data 1 which is supplied to the controller 100.

The controller 100 extracts the convex/concave identification information from the reproduction control data, stores it in a convex/concave identification information register 101 (step S5), and returns to the execution of a main routine (not shown).

According to the subroutine for acquiring the convex/concave identification information illustrated in FIG. 9, the controller 100 first reads the convex/concave identification information from the PEP area 4, indicating whether concave or convex recording pits are recorded in each of the first recording layer RY1 and second recording layer RY2 of the recording disc 80. Then, the controller 100 stores the convex/concave identification information in the convex/concave identification information register 101.

Figure 10:
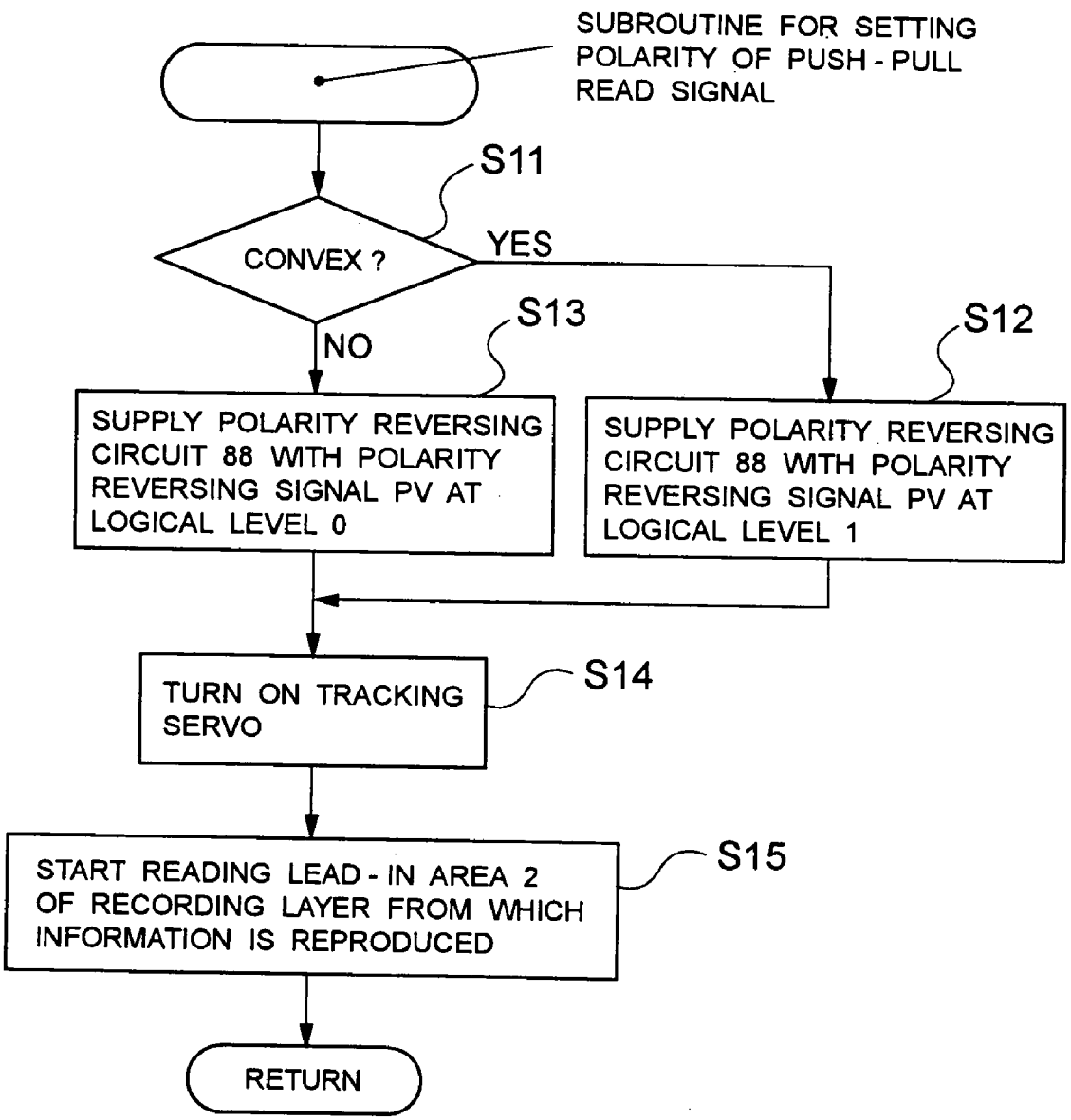
FIG. 10 is a diagram illustrating a subroutine executed by the controller 100 of the reproducing apparatus illustrated in FIG. 8 for setting the polarity of a push-pull read signal.

Here, for reproducing information data from the information data area 1 of the first recording layer RY1 or second recording layer 2 of the recording disc 80, the controller 100 executes a subroutine for setting the polarity of a push-pull read signal, as illustrated in FIG. 10.

In FIG. 10, the controller 100 first determines based on the convex/concave identification information stored in the convex/concave identification information register 101 whether or not concave recording pits are recorded on a recording layer (first recording layer RY1 or second recording layer RY2), from which information is to be reproduced (step S11). Upon determining concave recording pits at step S11, the controller 100 supplies a polarity reversing signal PV at logical level 1 to the polarity reversing circuit 88 (step S12). With the execution of step S12, the polarity reversing circuit 88 reverses the polarity of the push-pull read signal $R_{pp}$ to generate a push-pull read signal $R_{pp}'$ which is supplied to the wobble signal processing circuit 89 and tracking servo circuit 90, respectively. On the other hand, in failure of determining the concave recording pits at step S11, the controller 100 supplies the polarity reversing signal PV at logical level 0 to the polarity reversing circuit 88 (step S13). With the execution of step S13, the polarity reversing circuit 88 supplies the push-pull read signal $R_{pp}$ as it is to the wobble signal processing circuit 89 and tracking servo circuit 90, respectively, as the push-pull signal $R_{pp}'$. After the execution of step S12 or S13, the controller 100 supplies a tracking servo On signal to the tracking servo circuit 90 (step S14). Next, the controller 100 controls the pickup 81 in order to start reading information from the lead-in area 2 of the recording layer from which information data is to be reproduced (step S15). With the execution of steps S14 and S15, the lead-in data is acquired from the lead-in area 2 of the recording layer, from which information data is to be reproduced, thereby enabling the reproduction of the information data from the information data area 1 of the recording layer.

As described above, in the subroutine for setting the polarity of the push-pull read signal as illustrated in FIG. 10, the controller 100 first determines based on the convex/concave identification information read from the PEP area 4 of the recording disc 80 whether or not concave recording pits are recorded in the recording layer from which information data is to be reproduced. In this event, when determining that the recording pits are not concave but convex, the controller 100 makes a setting to maintain the polarity of the push-pull read signal, as it is, generated by the push-pull read signal generator circuit 84. On the other hand, when determining the concave recording pits, the controller 100 makes a setting to reverse the polarity of the push-pull read signal. Therefore, the tracking control is conducted in accordance with the push-pull read signal generated by the push-pull read signal generator circuit 84 when convex recording pits are recorded in the recording layer from which information data is to be reproduced, while the control tracking is conducted in accordance with the polarity-reversed push-pull read signal when the concave recording pits are recorded.

While the foregoing embodiment has been described in connection with an exemplary recording disc 90 which has two recording layers (RY1, RY2) as illustrated in FIG. 8, the present invention can be applied in a similar manner to a recording disc which has a plurality of recording layers equal to or more than three. Also, for manufacturing the recording disc, when a disc manufacturer is entrusted to employ the convex recording pits or concave recording pits, the present invention can be applied as well to a single-layer recording disc which has only one recording layer, with similar advantages provided therefrom.

Also, while the foregoing embodiment has been described in connection with an exemplary recording disc on which convex or concave recording pits are recorded, the present invention can be applied as well to a recording disc such as DVD-R which enables information data to be written thereon by changing a characteristic on a recording surface through phase change recording, magneto-optical recording or the like.

Figure 11:
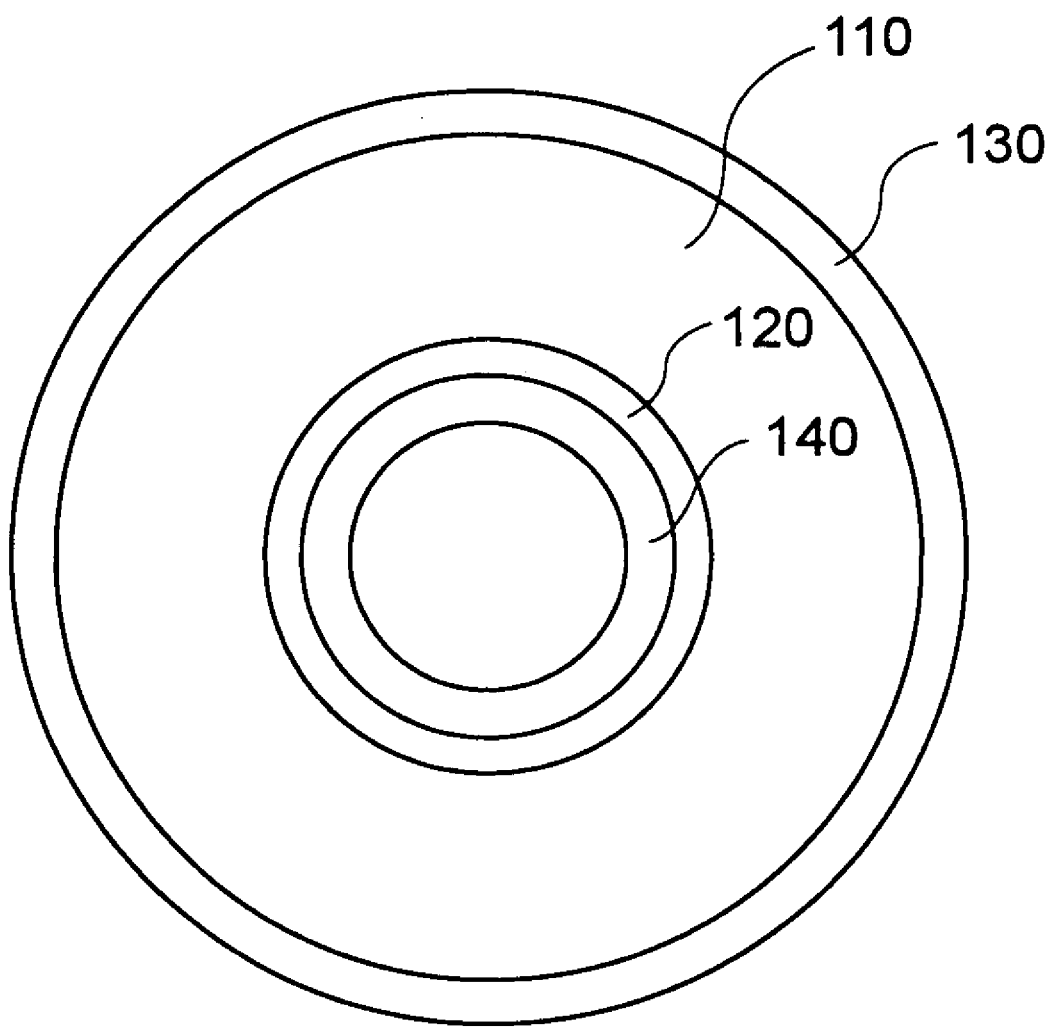
FIG. 11 is a plan view generally showing how areas are defined on a writable recording disc commercially available for general purposes.

FIG. 11 is a plan view generally showing how areas are defined on such a writable recording disc which is commercially available for general purposes.

As shown in FIG. 11, the recording disc is divided into an information data area 110, a lead-in area 120, a lead-out area 130, and a BCA (burst cutting area) 140.

The information data area 110 is an area for recording a variety of information data such as video, audio and computer data. The lead-in area 120 in turn is an area for recording lead-in data which includes the recorded position, time required for reproduction, disc identification information and the like for each of the information pieces recorded in the information data area 110. The BCA 140 in turn is an area in which reproduction control data including tracking information, convex/concave identification information and the like is recorded in the form of bar codes (later described). The tracking information refers to such information for specifying a tracking method which should be performed for reading recorded information from the information data area 110 and lead-in area 120. The convex/concave identification information in turn refers to such information for specifying whether the information data and lead-in data are recorded in a convex portion or a concave portion in the information data area 110 and lead-in area 120, respectively.

FIG. 12 is a diagram, viewed from the top surface of the disc, illustrating patterns in the information data area 110, lead-in area 120 and BCA 140, respectively.

Figure 13A:
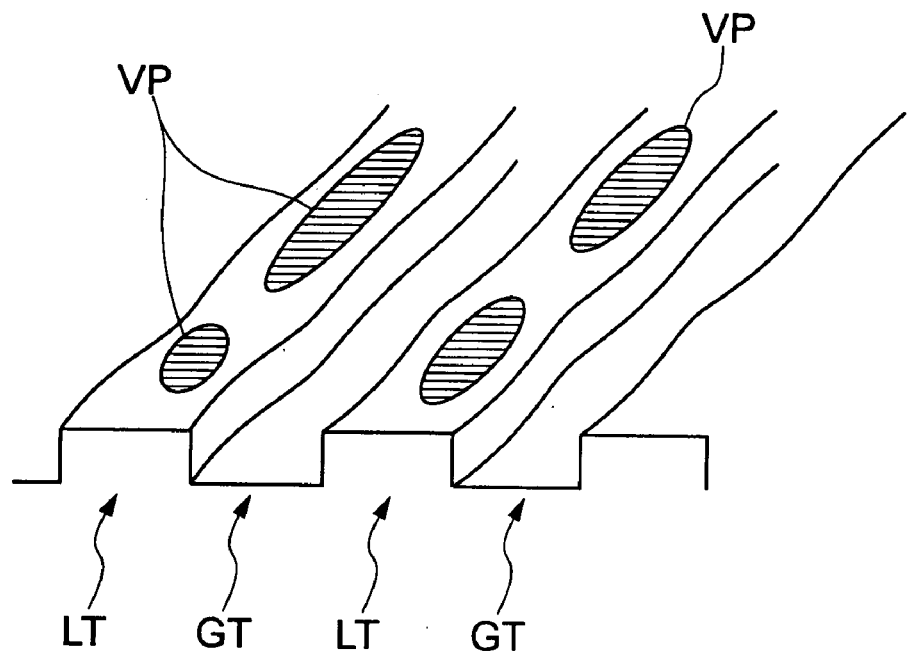
FIGS. 13A and 13B are diagrams showing exemplary patterns when information data is recorded on a land track LT and when information data is recorded on a groove track, respectively.
Figure 13B:
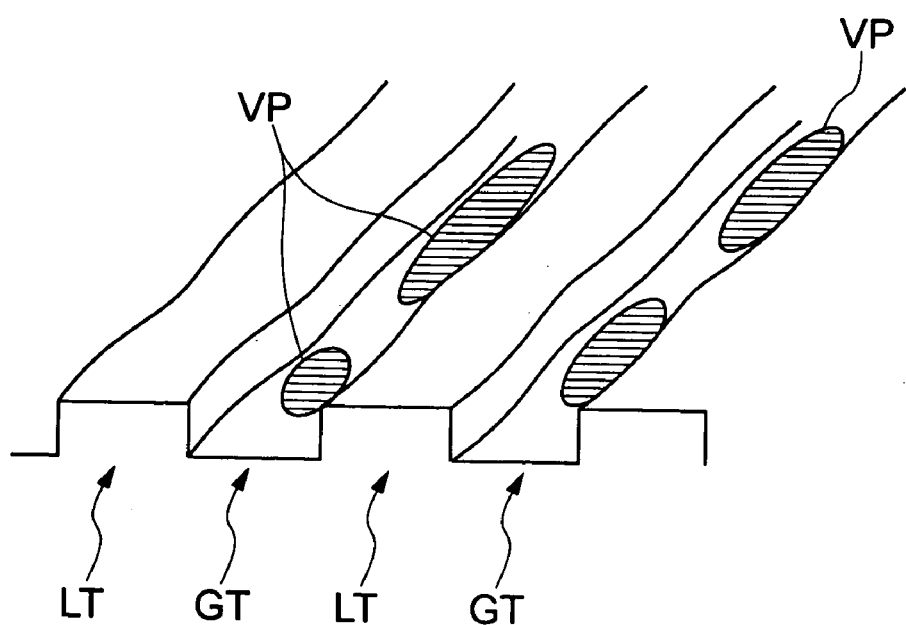

As illustrated in FIG. 12, the information data area 110 and lead-in area 120 are alternately formed with wobbled groove track GT and land track LT in a spiral fashion. As illustrated in FIGS. 13A and 13B, the groove track GT is concave, while the land track LT is convex. Here, for writing information data into the recording disc, a disc recorder intermittently irradiates one of the land track LT and groove track TG with a recording beam in accordance with the information data. In this event, a region irradiated with the recording beam has a characteristic (for example, the reflectivity, magnetization direction and the like) different from that of a region not irradiated with the recording beam. While this region is flat without convex or concave shape like the aforementioned recording pit, this region is hereinafter referred to as the "virtual pit" because it corresponds to the recording pit. Here, when the recording beam corresponding to information data is irradiated onto the groove track GT, virtual pits VP are formed on the concave groove track GT, as illustrated in FIG. 13B. On the other hand, when the recording beam corresponding to information data is irradiated onto the land track LT, virtual pits VP are formed on the convex land track LT, as illustrated in FIG. 13A. In this event, the BCA 140 as shown in FIG. 12 includes the convex/concave identification information recorded for specifying whether the virtual pits VP carrying the information data are recorded on the concave groove track GT or on the convex land track LT. In the BCA 140, the convex/concave identification information is represented by an array pattern of strip-shaped bar pits BP which extend from the inner periphery to the outer periphery of the disc as shown in FIG. 12. Therefore, even if the reading beam light traces an outlined arrow as shown in FIG. 12 because of the tracking servo loop remaining open, the convex/concave identification information can be read based on the array pattern of the bar pits BP in a maimer similar to the PEP area 4.

Figure 14:
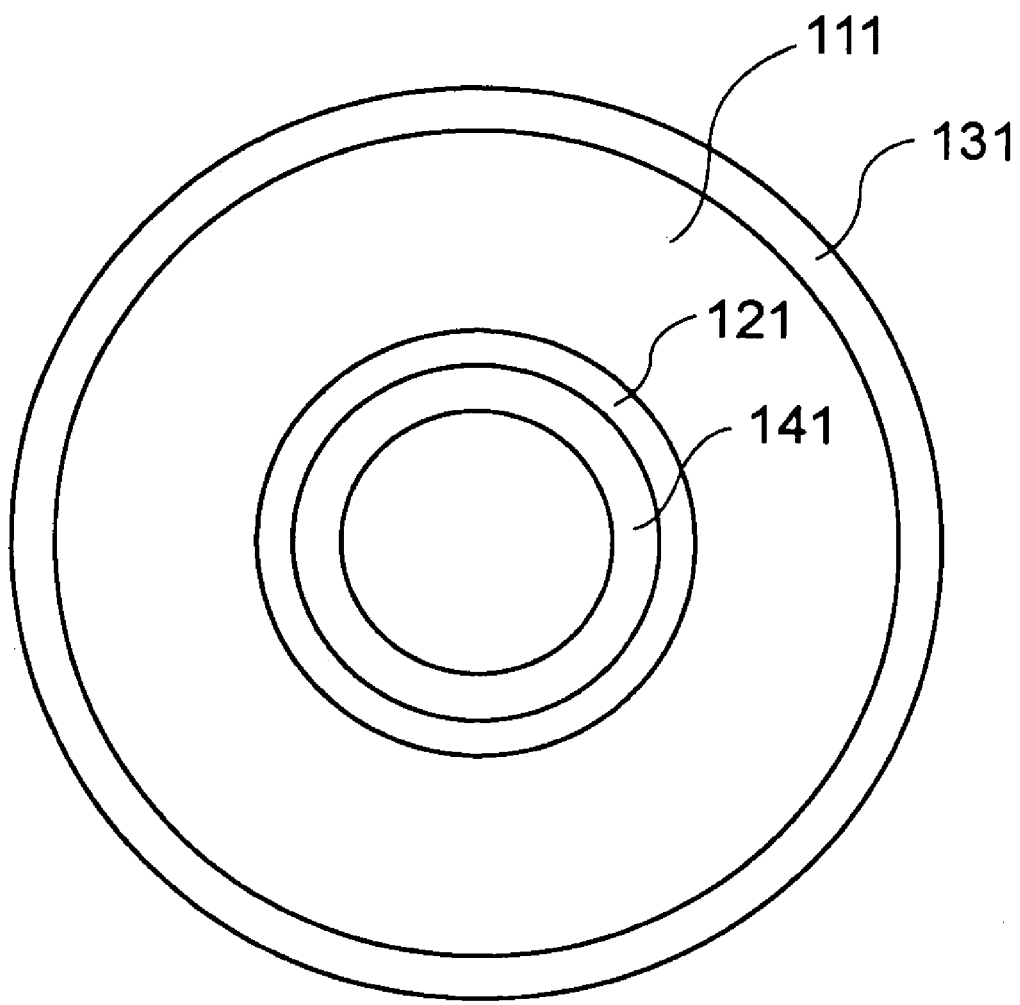
FIG. 14 is a plan view generally showing how areas are defined on a writable recording disc for authoring.

FIG. 14 is a plan view generally showing how areas are defined on a recording disc for authoring which is sold only to contracted dealers.

As shown in FIG. 14, the recording disc is divided into an information data area 111, a lead-in area 121, a lead-out area 131, and PEP (phase encoded part) area 141.

The information data area 111 is an area for recording a variety of information data such as video, audio and computer data. The lead-in area 121 in turn is an area for recording lead-in data including a recorded position, time required for reproduction, disc identification information and the like for each of information data pieces recorded in the information data area 111. The PEP area 141 in turn is an area in which reproduction control data, phase encoded as described above, is recorded, including tracking information, convex/concave identification information and the like. The convex/concave identification information refers to such information for specifying whether the information data and lead-in data should be recorded in a convex portion or a concave portion of the information data area 111 and lead-in area 121, respectively.

FIG. 15 is a diagram, viewed from the top surface of the disc, illustrating patterns in the information data area 111, lead-in area 121 and PEP area 141, respectively.

As illustrated in FIG. 15, the information data area 111 and lead-in area 121 are alternately formed with wobbled groove track GT and land track LT in a spiral fashion. As illustrated in FIGS. 13A and 13B, the groove track GT is convex, while the land track LT is concave. Here, when the recording beam corresponding to information data is irradiated onto the groove track GT, virtual pits VP are formed on the concave groove track GT, as illustrated in FIG. 13A. On the other hand, when the recording beam corresponding to information data is irradiated onto the land track LT, virtual pits VP are formed on the convex land track LT, as illustrated in FIG. 13B. In this event, the PEP area 141 as shown in FIG. 15 includes the convex/concave identification information which is recorded for specifying whether the virtual pits VP carrying the information data is recorded on the concave groove track GT or on the convex land track LT. A recording pattern in the PEP area 141 is basically the same as that illustrated in FIG. 3, except that the recording pits PT are recorded on the wobbled groove track GT or land track LT.

As described above, the recording disc according to the present invention has the convex/concave identification information recorded in the PEP area or BCA area for indicating whether recording pits carrying information data is concave or convex, or whether virtual pits are recorded in a convex portion (land track LT) or a concave portion (groove track GT). In other words, identification information is recorded in a control data area (PEP area or BCA), from which information can be read when the tracking servo is open, for indicating a recording pattern of recording marks such as the recording pits or virtual pits recorded on the recording disc.

Therefore, the recorded information reproducing apparatus illustrated in FIG. 8 reads the identification information from the recording disc with the open tracking servo, and once stores the identification information in the convex/concave identification information register 101. Then, the controller 100 supplies the polarity reversing circuit 88 with a polarity reversing signal PV in accordance with the recording pattern of the recording marks indicated by this identification information to set the polarity of the push-pull read signal.

According to the present invention, since the polarity of the push-pull read signal is set in accordance with the recording pattern of the recording marks recorded on the recording disc, an information reproducing operation can be immediately started without trial reading even in a recorded information reproducing apparatus which employs a push-pull based tracking control.

This application is based on Japanese Patent Applications Nos. 2002-128219 and 2002-258656 which are hereby incorporated by reference.

What is claimed is:

1. A recording disk, comprising:
a first recording layer;
a Burst Cutting Area (BCA) in which identification information is recorded,
wherein the identification information indicates a polarity of a first push-pull signal obtained from the first recording layer.

2. The recording disk as claimed in claim 1, further comprising a second recording layer,
wherein said identification information comprises first information that indicates the polarity of the first push-pull signal obtained from the first recording layer, and wherein said identification information comprises second information that indicates the polarity of a second push-pull signal obtained from the second recording layer.

3. The recording disk as claimed in claim 2, wherein said identification information is structured so that a reproduction apparatus can read said identification information from said recording disk while a tracking servo of said reproduction apparatus is in an open state.

4. The recording disk as claimed in claim 1, wherein said identification information is structured so that a reproduction apparatus can read said identification information from said recording disk while a tracking servo of said reproduction apparatus is in an open state.

5. A recording disk, comprising:
an information area in which information is recorded; and
a Burst Cutting Area (BCA) in which identification information is recorded,
wherein the identification information indicates a polarity of a push-pull signal obtained from the information area.

6. The recording disk as claimed in claim 5, wherein recording pits carrying said information are recorded in said information area.

7. The recording disk as claimed in claim 6, wherein said identification information comprises information that indicates whether said recording pits have a concave shape or a convex shape.

8. A recording disk, comprising:
an information area for recording information; and
a Burst Cutting Area (BCA) in which identification information is recorded,
wherein the identification information indicates a polarity of a push-pull signal obtained from one of a plurality of recording layers of the recording disk.

* * * * *